(12) United States Patent
McLaughlin

(10) Patent No.: US 6,789,641 B2
(45) Date of Patent: Sep. 14, 2004

(54) METHOD AND APPARATUS FOR CONTROLLING AN ELECTRIC ASSIST MOTOR USING A MODIFIED BLENDING FILTER

(75) Inventor: Kevin M McLaughlin, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 33 days.

(21) Appl. No.: 10/219,560

(22) Filed: Aug. 14, 2002

(65) Prior Publication Data

US 2004/0031641 A1 Feb. 19, 2004

(51) Int. Cl.⁷ .................................................. B62D 5/09
(52) U.S. Cl. ........................................ 180/446; 701/42
(58) Field of Search .................................. 180/443, 446; 701/41, 42; 318/432, 433, 610, 254; 388/811, 812, 813, 814, 820

(56) References Cited

U.S. PATENT DOCUMENTS

| | | | |
|---|---|---|---|
| 5,404,418 A | * | 4/1995 | Nagano ........................ 388/806 |
| 5,473,231 A | | 12/1995 | McLaughlin et al. |
| 5,475,289 A | * | 12/1995 | McLaughlin et al. ....... 318/432 |
| 5,504,403 A | | 4/1996 | McLaughlin |
| 5,568,389 A | | 10/1996 | McLaughlin et al. |
| 5,652,491 A | | 7/1997 | Ikawa et al. |
| 5,704,446 A | | 1/1998 | Chandy et al. |
| 5,743,351 A | | 4/1998 | McLaughlin |
| 5,919,241 A | | 7/1999 | Bolourchi et al. |
| 5,990,645 A | | 11/1999 | Nakamura et al. |
| 5,992,556 A | | 11/1999 | Miller |
| 6,046,560 A | | 4/2000 | Lu et al. |
| 6,107,767 A | * | 8/2000 | Lu et al. ...................... 318/561 |
| 6,422,335 B1 | * | 7/2002 | Miller ......................... 180/446 |

* cited by examiner

*Primary Examiner*—Daniel G. DePumpo
(74) *Attorney, Agent, or Firm*—Tarolli, Sundheim, Covell & Tummino L.L.P.

(57) ABSTRACT

A method for controlling an electric assist motor (50) for providing steering assist in response to a sensed torque signal ($\tau_s$) includes the step of filtering the sensed torque signal to provide a low frequency torque signal ($\tau_{sL}$) and a high frequency torque signal ($\tau_{sH}$). A low frequency assist torque signal ($\tau_{assistLF}$) is determined as a function of the low frequency torque signal ($\tau_{sL}$). A high frequency assist gain signal ($K_{max}$) is determined as a function of the sensed torque signal ($\tau_s$) and a sensed vehicle speed (v). The high frequency assist gain signal ($K_{max}$) is applied to the high frequency torque signal ($\tau_{sH}$) to determine a high frequency assist torque signal ($\tau_{assistHF}$). A torque command signal ($\tau_{cmd}$) is determined as a function of the low frequency assist torque signal ($\tau_{assistLF}$) and the high frequency assist torque signal ($\tau_{assistHF}$). The electric assist motor (50) is commanded to provide steering assist in accordance with the torque command signal ($\tau_{cmd}$).

16 Claims, 4 Drawing Sheets

METHOD AND APPARATUS FOR CONTROLLING AN ELECTRIC ASSIST MOTOR USING A MODIFIED BLENDING FILTER

TECHNICAL FIELD

The present invention is directed to a method and apparatus for controlling an electric assist motor. In particular, the present invention is directed to a method and apparatus for controlling an electric motor of an electric assist steering system using a modified blending filter.

BACKGROUND OF THE INVENTION

Electric assist steering systems are well known in the art. In such electric assist steering systems, an electric assist motor, when energized, provides steering assist torque to aid the driver in turning steerable wheels of the vehicle. The electric assist motor is typically controlled in response to both steering torque applied to the vehicle steering wheel

TECHNICAL FIELD

The present invention is directed to a method and apparatus for controlling an electric assist motor. In particular, the present invention is directed to a method and apparatus for controlling an electric motor of an electric assist steering system using a modified blending filter.

BACKGROUND OF THE INVENTION

Electric assist steering systems are well known in the art. In such electric assist steering systems, an electric assist motor, when energized, provides steering assist torque to aid the driver in turning steerable wheels of the vehicle. The electric assist motor is typically controlled in response to both steering torque applied to the vehicle steering wheel and measured vehicle speed. A controller monitors steering torque and controls a drive circuit which, in turn, supplies electric current to the electric assist motor. Such drive circuits typically include field effect transistors ("FETs") or other forms of solid state switches operatively coupled between the vehicle battery and the electric assist motor. Motor current is controlled by pulse width modulation ("PWM") of the FETs.

On-center feel is defined as the responsiveness of the steering system for a vehicle traveling in a substantially straight line. Good on-center feel occurs when the driver senses the vehicle lateral acceleration for small steering wheel angle inputs and when the vehicle travels in a straight line with minimal input from the driver. A vehicle that tends to wander or drift from the desired straight line is considered to have poor on-center feel.

Off-center feel is the responsiveness of the steering system in a steady state turn. Good off-center feel occurs when the driver, while in a steady state turn at a high vehicle speed, e.g., on a curved entrance ramp onto a freeway, can easily make small changes in the steering wheel angle that clearly modify the vehicle path. If the angular corrections are difficult to make due to high friction or hysteresis, or if the corrections do not causally modify the vehicle's path, the vehicle is characterized as having poor off-center feel.

At high vehicle speeds, it is desirable to provide good off-center response as well as good on-center feel. To accomplish this, a trade-off is made in selection of the torque signal to obtain acceptable on-center feel and off-center responsiveness.

Known electric assist steering systems have a dynamic performance characteristic, i.e., system bandwidth, that varies as a function of vehicle speed. As the vehicle operator applies steering torque and rotates the steering wheel back-and-forth, the electric assist motor is energized to provide steering assist in response to the sensed steering inputs. The response of the steering system at a particular frequency of back-and-forth steering wheel movement is indicative of the system's dynamic performance. The frequency range over which the steering system satisfactorily responds is the system's bandwidth.

The amount of local change at the electric assist motor divided by the amount of local change in steering torque applied by the driver is the steering system gain. Due to the control function of processing the sensed torque into a desired motor command, a time delay occurs from the time steering torque is applied to the steering wheel to the time the assist motor responds. This time delay is a function of the frequency at which the input command is applied. This is referred to as the system response time. The system gain is set to a predetermined value so as to have a short system response time while still maintaining overall system stability. The system response time and system gain are factors in the steering system bandwidth.

The bandwidth of a steering system varies as a function of vehicle speed. If dynamic steering frequency or the frequency of a transient steering input in an electric assist steering system exceeds the system bandwidth at a particular vehicle speed, the steering feel becomes "sluggish" (felt as a "hesitation" to a steering input) since the steering assist motor can not respond quick enough. Steering system gain as well as system bandwidth decreases in an electric assist steering system as the vehicle speed increases resulting in system hesitation or sluggishness becoming more noticeable as vehicle speed increases.

SUMMARY OF THE INVENTION

The present invention provides a method and apparatus for improving the steering feel in an electric motor in an electric assist steering system. A high frequency assist gain value is determined in response to vehicle speed and applied steering torque. The high frequency assist gain value is used to control a torque command value so as to provide good off-center tracking as well as good on-center feel.

The present invention is directed to a method for controlling an electric assist motor for providing steering assist in response to a sensed torque signal. The method comprises the step of filtering the sensed torque signal $\tau_s$ to provide a low frequency torque signal $\tau_{sL}$ and a high frequency torque signal $\tau_{sH}$. A low frequency assist torque signal $\tau_{assistLF}$ is determined as a function of the low frequency torque signal $\tau_{sL}$. A high frequency assist gain signal $K_{max}$ is determined as a function of the sensed torque signal $\tau_s$ and a sensed vehicle speed v. The high frequency assist gain signal $\kappa_{max}$ is applied to the high frequency torque signal $\tau_{sH}$ to determine a high frequency assist torque signal $\tau_{assistHF}$. A torque command signal $\tau_{cmd}$ is determined as a function of the low frequency assist torque signal $\tau_{assistLF}$ and the high frequency assist signal $\tau_{assistHF}$. The electric assist motor is commanded to provide steering assist in accordance with the torque command signal $\tau_{cmd}$.

The present invention is also directed to an apparatus for controlling a vehicle electric assist steering motor. The apparatus includes a vehicle speed sensor that provides a speed signal having a value indicative of sensed vehicle speed. An applied steering torque sensor provides a sensed torque signal indicative of the applied steering torque. The apparatus also includes filtering means that filters the sensed torque signal to provide a low frequency torque signal and a high frequency torque signal. Means for determining a low frequency assist torque value as a function of the low frequency torque signal provides a low frequency assist torque signal. Means for determining a high frequency assist gain value as a function of the sensed torque signal and a sensed vehicle speed provides a high frequency assist gain signal. The apparatus also includes means for determining a high frequency assist torque value related to the product of the high frequency torque signal and the high frequency assist gain signal and providing a high frequency assist torque signal. Means for determining a torque command value as a function of the low frequency assist torque signal and the high frequency assist torque signal provides a torque command signal. The apparatus further includes motor commanding means that commands the electric assist motor to provide steering assist in accordance with the torque command signal.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF A PREFERRED EMBODIMENT

Figure 1:
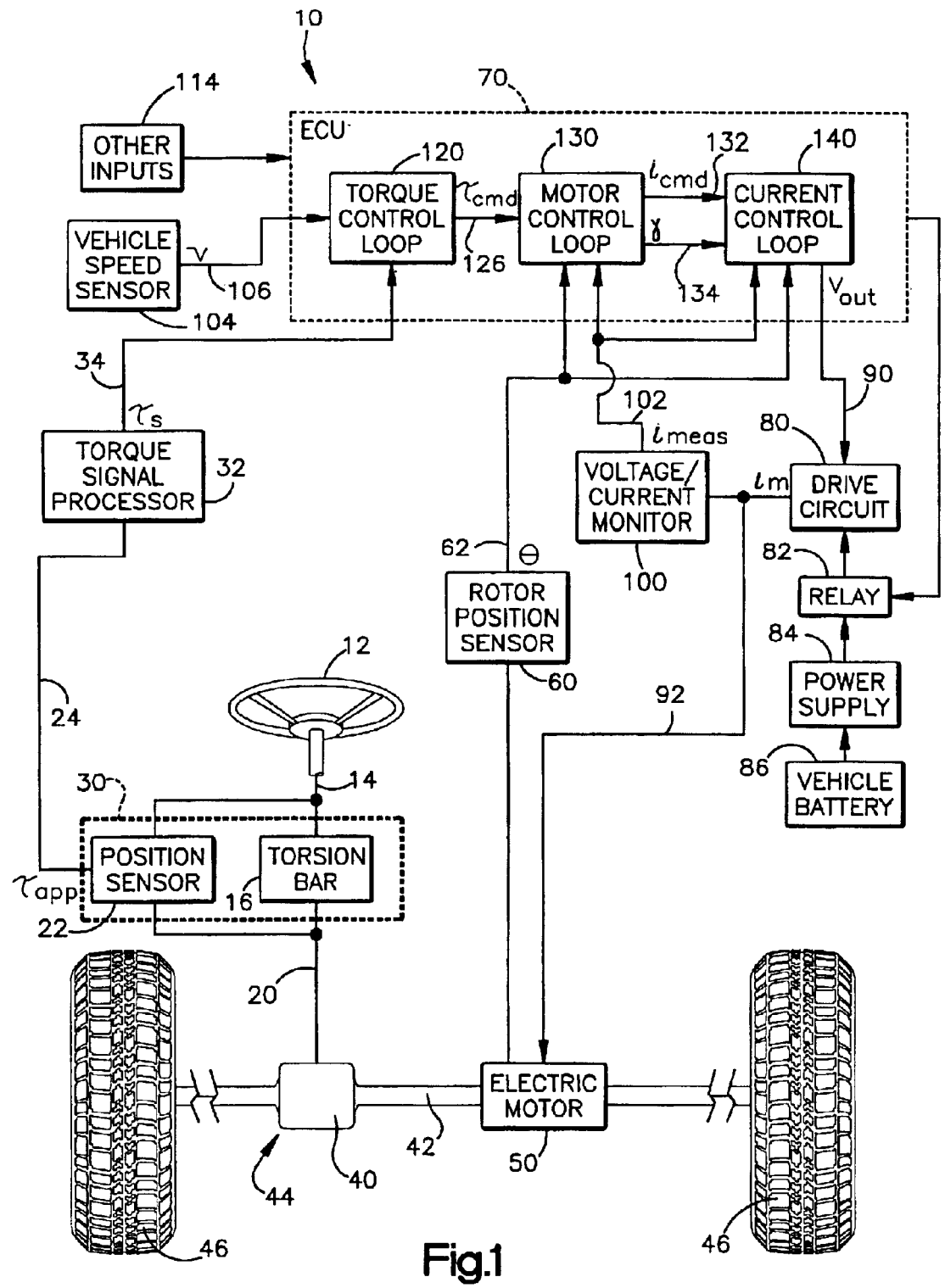
FIG. 1 is a schematic representation of an electric assist steering system in accordance with an example embodiment of the present invention.

Referring to FIG. 1, an electric assist steering system 10 includes a steering wheel 12 connected to an input shaft 14. The input shaft 14 is operatively connected to an output shaft 20 through a torsion bar 16. The torsion bar 16 twists in response to applied steering torque thereby permitting relative rotation between the input shaft 14 and the output shaft 20. Stops (not shown) limit the amount of relative rotation between the input and output shafts 14 and 20 in a manner known in the art. The torsion bar 16 has a spring constant, referred to herein as $\kappa_t$. The amount of applied steering torque as a function of relative rotational movement between the input shaft 14 and the output shaft 20 in response to applied steering torque is a function of $\kappa_t$. The spring constant $\kappa_t$ may be expressed in units of Newton-meters (N●M) or in-lbs. per degree of rotation between the input shaft 14 and the output shaft 20.

A position sensor 22 is operatively connected to the input shaft 14 and to the output shaft 20. The position sensor 22 in combination with the torsion bar 16 forms a torque sensor 30. The position sensor 22 determines the relative rotational position between the input shaft 14 and the output shaft 20. The torque sensor 30 provides an applied torque signal $\tau_{app}$, indicated at 24, to a torque signal processor 32. The applied torque signal $\tau_{app}$ is indicative of the relative rotational position between the input shaft 14 and the output shaft 20.

When the steering wheel 12 is rotated, the relative angle between the input shaft 14 and the output shaft 20 varies as a function of the input torque applied to the steering wheel. The torque signal processor 32 monitors the angle between the input shaft 14 and the output shaft 20 via the applied torque signal $\tau_{app}$ and, given the spring constant $\kappa_t$ of the torsion bar 16, provides a signal, shown at 34, indicative of the applied steering torque $\tau_s$.

The output shaft 20 is connected to a pinion gear 40. The pinion gear 40, as is well known in the art, has helical teeth that engage or mesh with straight cut teeth on a steering rack or linear steering member 42. The pinion gear 40 in combination with the gear teeth on the steering rack 42 form a rack and pinion gear set 44. The steering rack 42 is operatively coupled to the vehicle's steerable wheels 46 via steering linkage (not shown) in a known manner. When the steering wheel 12 is turned, the rack and pinion gear set 44 converts the rotary motion of the steering wheel 12 into linear motion of the steering rack 42. When the steering rack 42 moves in a linear direction, the steerable wheels 46 pivot about their associated steering axes.

According to the example embodiment, an electric assist motor 50 is operatively connected to the steering rack 42 through a ball-nut assembly (not shown) in a known manner or other desired gearing arrangement. Those skilled in the art will recognize that the electric assist motor 50 may have an alternative connection to the steering members for the purpose of providing steering assist. For example, the electric assist motor 50 could be operatively connected to the output shaft 20, to a separate pinion drive arrangement, etc. When energized, the electric assist motor 50 provides power assist to aid in the rotation of the vehicle steering wheel 12 by the vehicle operator.

The electric motor 50 of the example embodiment may be of any known type suitable for use in the electric assist steering system 10. For example, the electric motor 50 may be a variable reluctance ("VR") motor, a permanent magnet alternating current ("PMAC") motor or a brushless direct current ("BLDC") motor. In the example embodiment, the electric motor 50 is described herein as having the specific purpose of providing power assist in the electric assist steering system 10. The present invention is equally applicable to other motor configurations and other motor purposes such as providing mechanical power for machine tools.

The basic operation of an electric assist motor in an electric assist steering system 10 is well known in the art. Basically, the stator poles are energized to achieve a desired amount of motor torque in a desired rotational direction. The direction of motor rotation is controlled in response to the sequence in which the stator coils are energized in certain motor types and the direction of current flow in other motor types. The torque produced by the motor is controlled by the amount of current through the stator coils. For the purpose of explanation of an exemplary embodiment of the present invention, it is assumed that the electric assist motor 50 is a PMAC motor.

When the electric motor 50 is energized, the motor rotor turns which, in turn, rotates the nut portion of the ball-nut drive arrangement to which the rotor is connected. When the nut rotates, the balls transfer a linear force to the steering rack 42. The direction of movement of the steering rack 50 is dependent upon the direction of rotation of the electric motor 50.

A rotor position sensor 60 is operatively connected to the motor 50 and senses the position of the rotor relative to the stator. The position sensor 60 provides a rotor position signal θ, indicated at 62, having a value indicating that relative position between the rotor and the stator. The structure and operation of a rotor position sensor is known in the art and, therefore, is not described herein in detail. It is necessary to know the position of the rotor relative to the stator to achieve the desired rotational direction and output torque of the electric motor 50.

The electric assist steering system 10 includes an electronic control unit (ECU) 70. The ECU 70 is preferably a microcomputer having suitable memory. It will be appreciated that the ECU 70 may have other suitable configurations. The ECU 70 is programmed with control algorithms that are operative to control the electric motor 50 in a predetermined manner in response to sensed parameters.

The ECU 70 is operatively connected to a drive circuit 80. The drive circuit 80 is operatively connected to a power supply 84 via a relay 82. The power supply 84 is operatively connected to a vehicle battery 86 and regulates electrical power supplied to the drive circuit 80. The ECU 70 provides a voltage control output signal $v_{out}$, indicated at 90, to the drive circuit 80. The voltage control output signal $v_{out}$ is indicative of the voltage to be supplied to each phase of the electric motor 50, as determined by the control algorithms programmed in the ECU 70 and described below in detail.

The drive circuit 80 include FETs or other suitable forms of controllable solid state switches that are operative to provide motor current $\iota_m$, indicated at 92, to the phases of the electric motor 50. Motor current $\iota_m$ for each phase of the electric motor 50 is controlled by PWM of the FETs in accordance with the voltage control output signal $v_{out}$.

A voltage/current monitoring device 100 monitors the motor current $\iota_m$ provided to the electric motor 50 and provides a measured motor current signal $\iota_{meas}$ of each phase to the ECU 70. These measured motor current signals $\iota_{meas}$ are indicated at 102. The rotor position sensor 60 and the torque signal processor 32 provide the rotor position θ signal and the sensed torque $\tau_s$ signal, respectively, to the ECU 70. A vehicle speed sensor 104 provides a vehicle speed signal v, indicated at 106, to the ECU 70. Other inputs, indicated generally at 114, may also be provided to the ECU 70 for control, safety, or system monitoring purposes.

The control algorithms stored in the ECU 70 comprise a torque control loop 120, a motor control loop 130, and a current control loop 140. The torque control loop 120 is operative to determine a requested torque command signal $\tau_{cmd}$, indicated at 126. The torque command signal $\tau_{cmd}$ is indicative of the amount of steering assist torque required from the electric motor 50, based at least partially on the sensed steering applied torque $\tau_s$ and the sensed vehicle speed v. The torque control loop 120 provides the torque command signal $\tau_{cmd}$ to the motor control loop 130.

The motor control loop 130 is operative to determine a motor current command $\iota_{cmd}$, indicated at 132, and a dq current advance angle γ, indicated at 134. A dq current control loop is used to control the current in the electric motor 50. The current command signal $\iota_{cmd}$ indicates the amount of current to be supplied to the electric motor 50. The dq current advance angle γ indicates rotational angle of the motor current with respect to the q-axis to which the motor is to be commanded. The dq-current advance angle γ is determined as a function of motor speed and is non-zero only for high motor speeds. The current command signal $\iota_{cmd}$ and the dq current advance angle γ are determined based on the torque command $\tau_{cmd}$ and the sensed rotor velocity ω. The measured motor current $\iota_{meas}$ and the sensed rotor position θ are provided to the motor control loop 130 for feedback and monitoring purposes. The motor control loop 130 provides the motor current command $\iota_{cmd}$ and the dq current advance angle γ to the current control loop 140.

The current control loop 140 is operative to determine the voltage output signal $v_{out}$. As stated above, the voltage output signal $v_{out}$ is indicative of the voltage to be supplied to each phase of the PMAC electric assist motor 50. The voltage output signal $v_{out}$ is determined based at least partially on the current command $\iota_{cmd}$, the dq current advance angle γ, and the sensed rotor position θ. The voltage output signal $v_{out}$ is formatted to control PWM of the FETs in the drive circuit 80 such that appropriate amounts of motor current $\iota_m$ are provided to each phase of the electric motor 50. The measured motor current $\iota_{meas}$ is provided to the motor control loop 130 and the current control loop 140.

Figure 2:
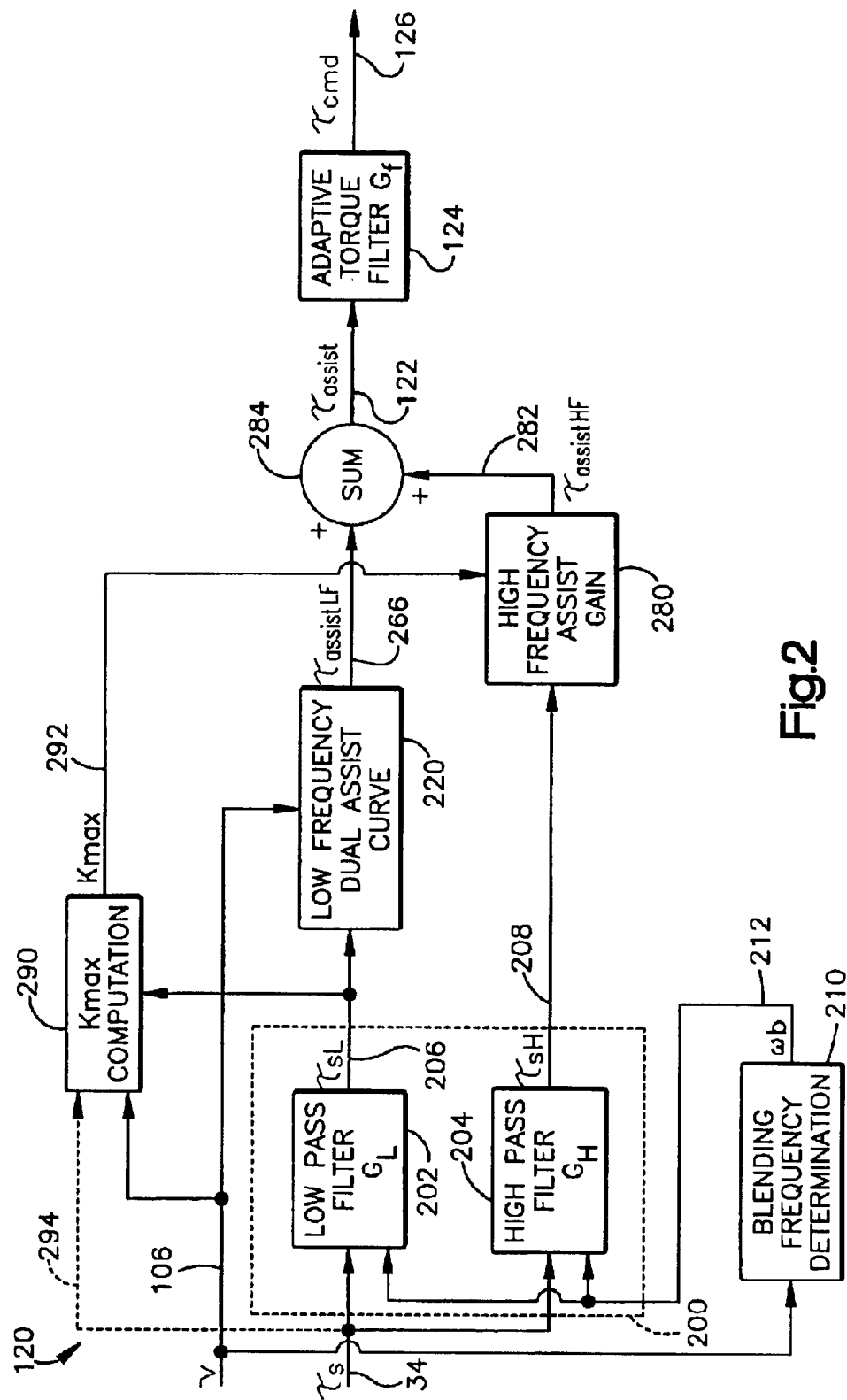
FIG. 2 is a functional block diagram of a torque control loop of the electric assist steering system of FIG. 1.

The torque control loop 120 is illustrated in FIG. 2. In this explanation, some of the functions performed by the ECU 70 are interchangeably referred to as functions or circuits. The sensed torque signal $\tau_s$ is provided to a blending filter 200 of the torque control loop 120. The blending filter 200 is designed by measuring the open loop transfer function $G_p$ as a function of vehicle speed. The blending filter 200 is designed to meet stability and performance specifications for all vehicle speeds v. The blending filter 200 is also designed to meet desired performance objectives, gain stability margins, and phase stability margins.

Specifically, the blending filter 200 includes a low pass filter ($G_L$) 202 and a high pass filter ($G_H$) 204. The low and high pass filters 202 and 204 are designed such that summation of the two filters is equal to one for all frequencies. The low pass filter 202 allows all of the sensed torque signal $\tau_s$ with frequency content below a blending frequency $\omega_b$ to pass through while rejecting all high frequency content of the signal. The high pass filter 204 allows all of the sensed torque signal $\tau_s$ with frequency content above the blending frequency $\omega_b$ to pass through while rejecting all low frequency content of the signal. The blending filter frequency $\omega_b$, indicated at 212, is determined as a function of vehicle speed v by a blending filter determination function 210. The determination of $\omega_b$ may be accomplished using a look-up table in the ECU 70 or may be accomplished by performing a calculation in accordance with a predetermined equation.

The blending filters are chosen such that the sum of the low pass filter $G_L(S)$ and the high pass filter $G_H(S)$ is always equal to one:

$$G_L(S) + G_H(S) = 1 \qquad (1)$$

In accordance with the example embodiment, the low pass filter 202 is chosen to be a first order filter with a pole at the blending frequency $\omega_b$. The high pass filter 204 is uniquely defined by the above constraint that the sum of the two filters must be one. Therefore, the low and high pass filters are:

$$G_L(S) = \frac{\omega_b}{S + \omega_b} \qquad (2)$$

-continued $$G_H(S) = \frac{S}{S + \omega_b} \quad (3)$$

When realizing a set of blending filters in a digital computer, those skilled in the art will appreciate that it is not necessary to construct separate high and low pass filter stages. Rather, the sensed torque signal $\tau_s$ input to the blending filters is passed through the low pass filter to obtain the low-passed torque signal $\tau_{sL}$. The high-passed torque signal is the sensed torque $\tau_s$ minus the low-passed torque signal $\tau_{sL}$. The low frequency portion $\tau_{sL}$ is thus subtracted from the sensed torque signal $\tau_s$:

$$\tau_{sH} = \tau_s - \tau_{sL} \quad (4)$$

The result is a signal with only high frequency information. It will be appreciated that higher order blending filters may be used.

Figure 3:
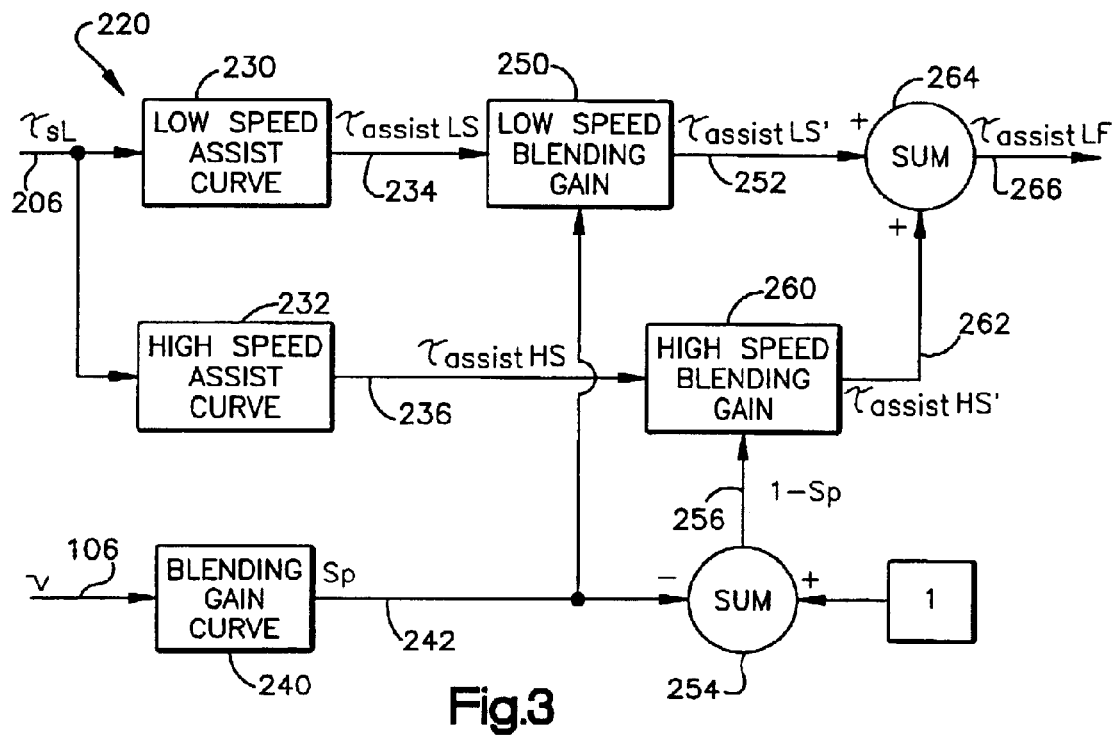
FIG. 3 is a functional block diagram of a low frequency dual assist curve function of FIG. 2.

The low pass filter 202 provides a low-passed torque signal $\tau_{sL}$, indicated at 206, to a low frequency dual assist curve circuit 220. The dual assist curve circuit 220 provides a low frequency assist torque signal $\tau_{assistLF}$ having a value functionally related to the low-passed torque signal $\tau_{sL}$ and the sensed vehicle speed v. The dual assist curve function 220 is illustrated in FIG. 3. The dual assist curve circuit 220 is illustrative of one method for determining the low frequency assist torque $T_{assistLF}$ based on the low-passed torque signal $\tau_{sL}$. Those skilled in the art will appreciate that there are other methods for determining the low frequency assist torque $\tau_{assistLF}$ based on the low-passed torque signal $\tau_{sL}$. It will be appreciated that such other methods could replace the dual assist curve circuit 220 of the torque control loop 120 without departing from the spirit of the present invention. For example, a dual assist curve that may be used in accordance with the present invention is described in U.S. Pat. No. 5,568,389, issued to McLaughlin et al., and is hereby fully incorporated by reference.

The low-passed torque signal $\tau_{sL}$ is provided to a low-speed assist curve function 230, which provides a low-speed assist torque signal $\tau_{assistLS}$, indicated at 234. The low-speed assist torque signal $\tau_{assistLS}$ represents an assist torque value intended for low or zero speed situations, such as vehicle parking. The low-speed assist torque signal $\tau_{assistLS}$ is determined as a function of the low-passed torque signal $\tau_{sL}$, which may be accomplished using a look-up table stored in the ECU 70 or may be accomplished by performing a calculation in accordance with a predetermined equation. The low speed assist curve typically has a deadband, wherein no assist is provided until the steering wheel torque exceeds a predetermined level. The deadband is required so that the steering wheel returns to center when released by the driver.

The low-passed torque signal $\tau_{sL}$ is also provided to a high-speed assist curve function 232, which provides a high-speed assist torque signal $\tau_{assistHS}$, indicated at 236. The high-speed assist torque signal $\tau_{assistHS}$ represents an assist torque value intended for high speed vehicle operation, such as highway driving. The high-speed assist torque signal $\tau_{assistHS}$ is determined as a function of the low-passed torque signal $\tau_{sL}$, which may be accomplished using a look-up table stored in the ECU 70 or may be accomplished by performing a calculation in accordance with a predetermined equation.

The vehicle speed signal v is provided to a blending gain curve circuit 240, which provides a speed proportional blending term or value $S_p$, indicated at 242. The speed proportional blending term $S_p$ varies between zero and one as a function of vehicle speed. In the example embodiment, speed proportional blending term $S_p$ varies between zero at high or maximum vehicle speeds and one at low or zero vehicle speed. The speed proportional blending term $S_p$ is used to blend the low-speed assist torque $\tau_{assistLS}$ with the high-speed assist torque $\tau_{assistHS}$.

The speed proportional blending term $S_p$ and the low-speed assist torque $\tau_{assistLS}$ are provided to a low-speed blending gain circuit 250, which provides a blended low-speed assist torque signal $\tau_{assistLS}'$, indicated at 252. The low-speed blending gain circuit 250 multiplies the low-speed assist torque $\tau_{assistLS}$ by a low-speed blending gain value which is equal to the speed proportional blending term $S_p$.

The speed proportional blending term $S_p$ is subtracted from one at a summation circuit 254 to determine a high-speed blending gain value $1-S_p$, indicated at 256. The high-speed blending gain value $1-S_p$ and the high-speed assist torque $\tau_{assistHS}$ are provided to a high-speed blending gain circuit 260, which provides a blended high-speed assist torque signal $\tau_{assistHS}'$, indicated at 262. The high-speed blending gain circuit 260 multiplies the high-speed assist torque $\tau_{assistHS}$ by the high-speed blending gain value $1-S_p$. The sum of the low and high-speed blending gain values are thus always equal to one.

The blended low-speed assist torque signal $\tau_{assistLS}'$ and the blended high-speed assist torque signal $\tau_{assistHS}'$ are summed at a summing circuit 264 to provide a low frequency assist torque signal $\tau_{assistLF}$, indicated at 266. The low frequency assist torque signal $\tau_{asSistLF}$ is thus determined according to:

$$\tau_{assistLF} = (S_p \times \tau_{assistLS}) + ((1-S_p) \times \tau_{assistHS}); \quad (5)$$

and thus provides a smooth interpolation of the low and high-speed assist torque values $\tau_{assistLS}$ and $\tau_{assistHS}$ as vehicle speed v changes.

Referring to FIG. 2, the high-passed torque signal $\tau_{sH}$ is provided to a high frequency assist gain circuit 280, which determines a high frequency assist signal $\tau_{assistHF}$, indicated at 282. The high frequency assist signal $\tau_{assistHF}$ is added to the low frequency assist torque signal $\tau_{assistLF}$ at a summing circuit 284 to determine a torque assist signal $\tau_{assist}$, indicated at 122.

The torque assist signal $\tau_{assist}$ may be filtered through an adaptive torque filter $G_f$, indicated at 124, to determine the motor command signal $\tau_{cmd}$. An example of such an adaptive torque filter $G_f$ is described in U.S. Pat. No. 5,473,231, issued to McLaughlin et al., which is hereby fully incorporated by reference.

The high frequency assist signal $\tau_{assistHF}$ is determined as the product of the high-passed torque signal $\tau_{sH}$ and a high frequency assist gain $\kappa_{max}$. The high frequency assist gain $\kappa_{max}$ helps determine the bandwidth of the electric assist steering system 10. At high vehicle speeds, it is desirable to incorporate a relatively high value for the high frequency gain $\kappa_{max}$ in order to provide good off-center tracking. It is, however, also desirable, at high vehicle speeds, to incorporate a relatively low value for the high frequency gain $\kappa_{max}$ in order to provide good on-center feel. According to the present invention, the high frequency gain $\kappa_{max}$ is determined according to an algorithm that provides good off-center tracking and good on-center feel at high vehicle speeds.

The high frequency assist gain $\kappa_{max}$, indicated at 292, is determined at a $\kappa_{max}$ computation function 290. According to the present invention, the high frequency assist gain $\kappa_{max}$ is determined as a function of the vehicle speed v and the sensed torque signal $\tau_s$. In the example embodiment of FIG. 2, the high frequency assist gain $\kappa_{max}$ is determined as a function of the vehicle speed v and the low-passed torque signal $\tau_{sL}$. The high frequency assist gain $\kappa_{max}$ could, however, be determined as a function of the vehicle speed v and the sensed torque signal $\tau_s$, as illustrated by the dashed line labeled 294 in FIG. 2. Of course, in this instance, it would not be necessary to provide the low-passed torque signal $\tau_{sL}$ to the $\kappa_{max}$ computation circuit 290.

Figure 4:
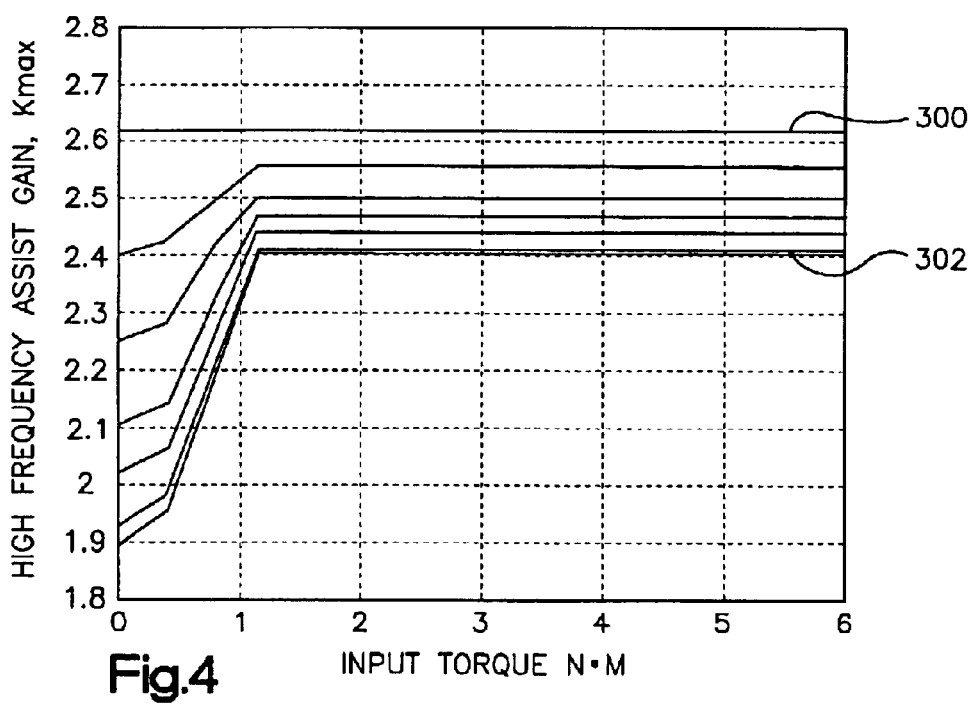
FIG. 4 is a graph illustrating high frequency assist curves of a high frequency assist gain computation function of FIG. 2.

The graph of FIG. 4 illustrates an example by which the high frequency assist gain $\kappa_{max}$ is determined as a function of the vehicle speed v and the input torque. It will be appreciated that this graph may change, depending on the particular vehicle platform and/or desired steering response characteristics. As stated above, the input torque may be the sensed torque signal $\tau_s$ or the low-passed torque signal $\tau_{sL}$.

Referring to FIG. 4, the high frequency assist gain $\kappa_{max}$ for low or zero speed is defined by the curve indicated at 300. The high frequency assist gain $\kappa_{max}$ for high or maximum speed is defined by the curve indicated at 302. The curves spaced between the low-speed and high-speed high frequency assist curves 300 and 302 indicate the high frequency assist gain $\kappa_{max}$ at predetermined incremental variations in vehicle speed.

As indicated by the low-speed $\kappa_{max}$ curve 300, at low vehicle speeds, the high frequency assist gain $\kappa_{max}$ is constant, i.e., is the same regardless of the amount of input torque. The low-speed $\kappa_{max}$ curve 300 could, however, be adapted to provide a high frequency assist gain $\kappa_{max}$ that varies with the amount of input torque. As vehicle speed v increases, the high frequency assist gain $\kappa_{max}$ varies depending on the vehicle speed and the input torque, i.e., the low-passed torque $\tau_{sL}$. In general, the high frequency assist gain $\kappa_{max}$ increases from a minimum value, depending on vehicle speed, as the input torque increases from zero N●M. The high frequency assist gain $\kappa_{max}$ increases at a generally low rate or slope from zero N●M. to about 0.3 N●M. At about 0.3 N●M., the high frequency assist gain $\kappa_{max}$ increases at a higher rate or slope from 0.3 N●M. to just over 1.0 N●M. At about just over 1.0 N●M., the high frequency assist gain $\kappa_{max}$ remains constant regardless of the amount of input torque.

The $\kappa_{max}$ computation circuit 290 determines the high frequency assist gain $\kappa_{max}$ in accordance with the curves illustrated in FIG. 4. The computation may be accomplished using a look-up table stored in the ECU 70. Interpolation techniques may be used to determine the high frequency assist gain $\kappa_{max}$ when the vehicle speed v is between the predetermined speeds defined by the two closest speed curves. The $\kappa_{max}$ computation circuit 290 alternatively could determine the high frequency assist gain $\kappa_{max}$ by performing a calculation in accordance with a predetermined equation selected in accordance with the $\kappa_{max}$ curves in FIG. 4.

As a preferred alternative, the $\kappa_{max}$ computation circuit 290 performs a dual curve blending algorithm, similar to the algorithm incorporated in the low frequency dual assist curve circuit 220 (FIG. 3), to determine the high frequency assist gain $\kappa_{max}$. In this instance, the low-speed $\kappa_{max}$ curve 300 (FIG. 4) is blended with the high-speed $\kappa_{max}$ curve 302 to determine the high frequency assist gain $\kappa_{max}$. This is illustrated in FIG. 5.

Figure 5:
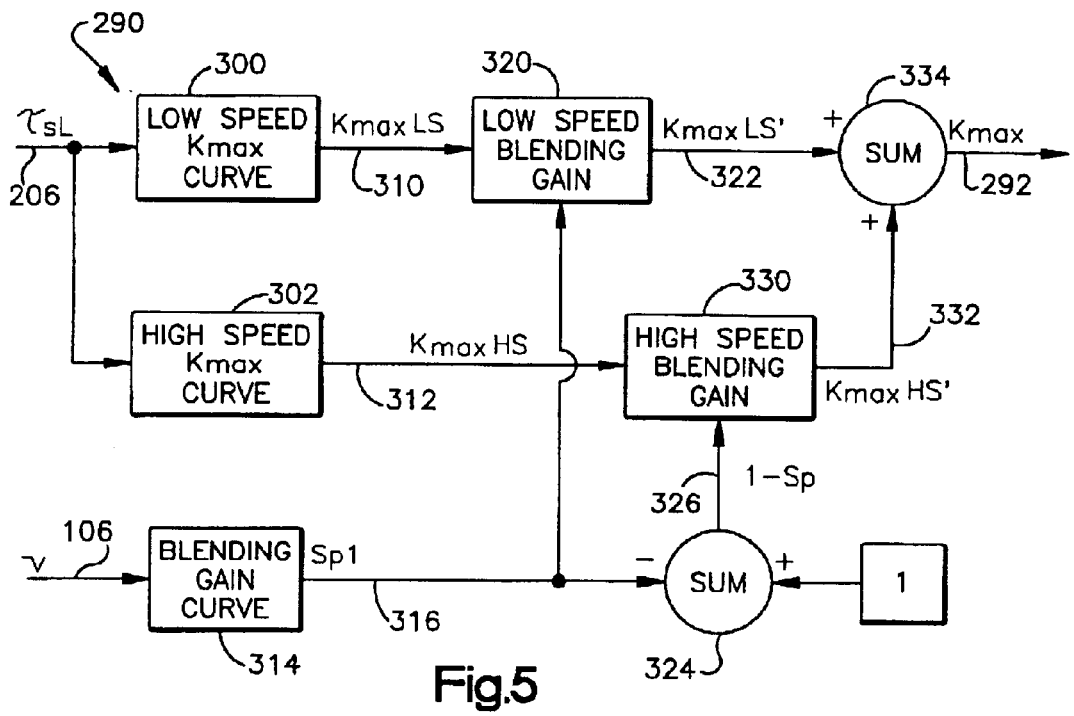
FIG. 5 is a functional block diagram of the high frequency assist gain computation function of FIG. 2.

Referring to FIG. 5, the low-passed torque signal $\tau_{sL}$ 206 is provided to the low-speed $\kappa_{max}$ curve 300, which provides a low-speed high frequency assist gain $\kappa_{maxLS}$, indicated at 310. The low-speed high frequency assist gain $\kappa_{maxLS}$ represents a high frequency assist gain value intended for low or zero vehicle speed situations, such as vehicle parking. The low-speed high frequency assist gain $\kappa_{maxLS}$ is determined as a function of the low-passed torque signal $\tau_{sL}$, which may be accomplished using a look-up table stored in the ECU 70 or may be accomplished by performing a calculation in accordance with a predetermined equation.

The low-passed torque signal $\tau_{sL}$ is also provided to the high-speed $\kappa_{max}$ curve 302, which provides a high-speed high frequency assist gain $\kappa_{maxHS}$, indicated at 312. The high-speed high frequency assist gain $\kappa_{maxHS}$ represents a high frequency assist gain intended for high speed vehicle operation, such as highway driving. The high-speed high frequency assist gain $\kappa_{maxHS}$ is determined as a function of the low-passed torque signal $\tau_{sL}$, which may be accomplished using a look-up table stored in the ECU 70 or may be accomplished by performing a calculation in accordance with a predetermined equation.

Figure 6:
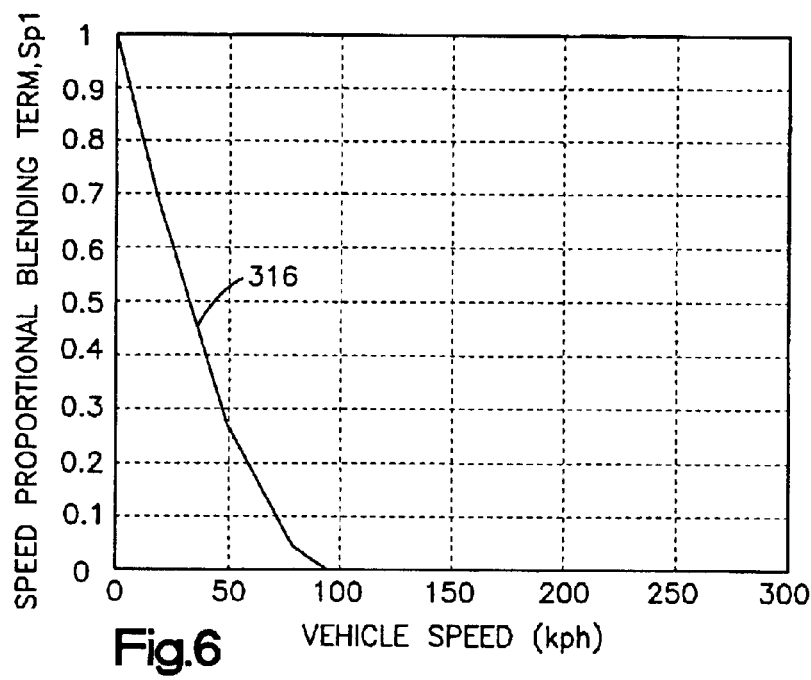
FIG. 6 is a graph illustrating a speed proportional gain curve used by the high frequency assist gain computation function of FIG. 2.

The vehicle speed signal v 106 is provided to a blending gain curve circuit 314, which provides a speed proportional blending term or value $S_{p1}$ (also referred to as a foldback gain), indicated at 316. The speed proportional blending term $S_{p1}$ varies between zero and one as a function of vehicle speed v, as illustrated by the graph of FIG. 6. As shown in FIG. 6, in the example embodiment, speed proportional blending term $S_{p1}$, indicated at 316, varies between zero at high vehicle speeds and one at zero vehicle speed. The speed proportional blending term $S_{p1}$ is used to blend the low-speed high frequency assist gain $\kappa_{maxLS}$ with the high-speed high frequency assist gain $\kappa_{maxHS}$.

Referring to FIG. 5, the speed proportional blending term $S_{p1}$ and the low-speed high frequency assist gain $\kappa_{maxLS}$ are provided to a low-speed blending gain function 320, which provides a blended low-speed high frequency assist gain $\kappa_{maxLS}'$, indicated at 322. The low-speed blending gain circuit 320 multiplies the low-speed high frequency assist gain $\kappa_{maxLS}$ by a low-speed blending gain value which is equal to the speed proportional blending term $S_{p1}$.

The speed proportional blending term $S_{p1}$ is subtracted from one at a summation circuit 324 to determine a high-speed blending gain value $1-S_{p1}$, indicated at 326. The high-speed blending gain value $1-Sp_1$ and the high-speed high frequency assist gain $\kappa_{maxHS}$ are provided to a high-speed blending gain circuit 330, which provides a blended high-speed high frequency assist gain $\kappa_{maxHS}'$, indicated at 332. The high-speed blending gain circuit 330 multiplies the high-speed high frequency assist gain $\kappa_{maxHS}$ by the high-speed blending gain value $1-S_{p1}$. The sum of the low and high-speed blending gain values are thus always equal to one.

The blended low-speed high frequency assist gain $\kappa_{maxLS}'$ and the blended high-speed high frequency assist gain $\kappa_{maxHS}'$ are summed at a summing circuit 334 to provide the calculated $\kappa_{max}$ 292. $\kappa_{max}$ is thus determined according to:

$$\kappa_{max}=(S_{p1}\times\kappa_{max\ LS})+((1-S_{p1})\times\kappa_{max\ HS}) \qquad (6)$$

and thus provides a smooth interpolation of the low and high-speed high frequency assist gain values $\kappa_{maxLS}$ and $\kappa_{maxHS}$ as vehicle speed v changes.

According to the present invention, the high frequency assist gain $\kappa_{max}$ is determined based on both vehicle speed v and input torque $\tau_{sL}$. As illustrated by the $\kappa_{max}$ curves in FIG. 4, in general, the high frequency assist gain $\kappa_{max}$ increases as vehicle speed v decreases. Also, at any given speed, the high frequency assist gain $\kappa_{max}$ varies as a function of input torque $\tau_{sL}$. In general, for the particular $\kappa_{max}$ curves illustrated in FIG. 4, at any given speed (except zero speed where $\kappa_{max}$ is constant), the high frequency assist gain $\kappa_{max}$ is lower for low input torque values and higher for high input torque values. Therefore, according to the present invention, at high vehicle speeds v, the high frequency assist gain $\kappa_{max}$ is adapted to provide good off-center tracking as well as good on-center feel.

For input frequencies above the blending frequency $\omega_b$, the torque control loop 120 is dominated by the high frequency assist gain portion 280 of the loop. Stability is easily analyzed and tested because the system behaves like a linear system near the zero crossover frequency. Since the blending frequency $\omega_b$ and the high frequency assist gain $\kappa_{max}$ are both functions of vehicle speed v, the system bandwidth of the electric assist steering system 10 can be controlled as a function of vehicle speed. This can be done by modifying the high frequency assist gain $\kappa_{max}$ via the speed proportional blending term $S_{p1}$. The bandwidth decreases as the high frequency assist gain $\kappa_{max}$ decreases. Therefore, the high frequency portion of the torque control loop 120 defines the transient response and stability characteristics of the electric assist steering system 10.

For frequencies below the blending frequency $\omega_b$, the torque control loop 120 is dominated by the low frequency dual assist curve portion 220 of the loop. This low frequency portion of the torque control loop 120 determines how the electric assist steering system 10 feels to the driver for slow, steady inputs. The dual assist curves may be tuned such that the electric assist steering system 10 provides a desired steering feel.

The amount of assist torque provided by the electric assist steering system 10 increases gradually as input torque ($\tau_{meas}$) increases away from the steering wheel torque deadband. When coming off of the deadband, the local gain of the electric assist steering system 10 is generally very low, i.e., it takes a large change in input torque to produce a small change in steering assist torque. Without the high frequency assist gain portion 280 of the torque control loop 120, the overall system bandwidth would be reduced at low input torque and the electric assist steering system 10 would feel sluggish. The inclusion of the high frequency assist gain portion 280 of the torque control loop 120, however, allows the system bandwidth to be selectable and causes the system to respond smoothly coming off of the deadband.

If the blending frequency $\omega_b$ is chosen a decade lower than the zero deadband crossover frequency, the non-linear low frequency dual assist curve portion 220 of the torque control loop 120 is a slowly varying phenomena when compared to the dynamics of the steering system. In essence, the non-linear low frequency portion is dynamically decoupled from the linear high frequency assist gain portion 280 of the torque control loop 120. The electric assist steering system 10 thus behaves in a non-linear fashion for low frequency inputs, and in a linear fashion for high frequency inputs.

From the above description of the invention, those skilled in the art will perceive improvements, changes and modifications. Such improvements, changes and modifications within the skill of the art are intended to be covered by the appended claims.

Having described the invention, the following is claimed:

1. A method for controlling an electric assist motor for providing steering assist in response to a sensed torque signal, said method comprising the steps of:
    filtering the sensed torque signal to provide a low frequency torque signal and a high frequency torque signal;
    determining a low frequency assist torque signal as a function of said low frequency torque signal;
    determining a high frequency assist gain signal as a function of said sensed torque signal and a sensed vehicle speed;
    applying said high frequency assist gain signal to said high frequency torque signal to determine a high frequency assist torque signal;
    determining a torque command signal as a function of said low frequency assist torque signal and said high frequency assist torque signal; and
    commanding the electric assist motor to provide steering assist in accordance with a voltage output signal, said voltage output signal being functionally related to said torque command signal.

2. The method recited in claim 1, wherein said step of filtering provides said low frequency torque signal having frequencies below a blending frequency, and provides said high frequency torque signal having frequencies above said blending frequency.

3. The method recited in claim 2, further comprising the step of determining said blending frequency as a function of said sensed vehicle speed.

4. The method recited in claim 1, wherein said step of determining a low frequency assist torque signal comprises the steps of providing dual assist curves and performing a blending algorithm to blend said dual assist curves to provide said low frequency assist torque signal.

5. The method recited in claim 1, wherein said step of determining a high frequency assist gain signal comprises determining said high frequency assist gain signal as a function of said low frequency torque signal and vehicle speed.

6. The method recited in claim 1, wherein said step of determining a high frequency assist gain signal comprises the steps of:
    determining a low vehicle speed high frequency assist gain as a function of said sensed torque signal;
    determining a high vehicle speed high frequency assist gain as a function of said sensed torque signal; and
    blending said low vehicle speed high frequency assist gain and said high vehicle speed high frequency assist gain as a function of vehicle speed.

7. The method recited in claim 6, wherein said step of blending said low-speed high frequency assist gain and said high-speed high frequency assist gain comprises the steps of:
    determining a speed proportional factor as a function of the sensed vehicle speed, said speed proportional factor having a value ranging from zero to one based on the sensed vehicle speed;
    determining a blended low-speed high frequency assist gain as the product of said low-speed high frequency assist gain and said speed proportional factor;
    determining a blended high-speed high frequency assist gain as the product of said high-speed high frequency assist gain and the difference between one and said speed proportional factor; and
    determining the sum of said blended low-speed high frequency assist gain and said blended high-speed high frequency assist gain.

8. The method recited in claim 1, wherein said step of applying said high frequency assist gain signal comprises the step of determining a product of said high frequency torque signal and said high frequency assist gain signal.

9. The method recited in claim 1, wherein said step of determining a torque command signal comprises the steps of:

determining a sum of said low frequency assist torque signal and said high frequency assist torque signal; and filtering said sum of said low frequency assist torque signal and said high frequency assist torque signal through an adaptive torque filter.

10. An apparatus for controlling a vehicle electric assist steering motor, said apparatus comprising:

a vehicle speed sensor providing a speed signal having a value indicative of sensed vehicle speed;

an applied steering torque sensor providing a sensed torque signal indicative of the applied steering torque;

means for filtering the sensed torque signal to provide a low frequency torque signal and a high frequency torque signal;

means for determining a low frequency assist torque value as a function of said low frequency torque signal and providing a low frequency assist torque signal indicative thereof;

means for determining a high frequency assist gain value as a function of said sensed torque signal and a sensed vehicle speed and providing a high frequency assist gain signal indicative thereof;

means for determining a high frequency assist torque value related to the product of said high frequency torque signal and said high frequency assist gain signal and for providing a high frequency assist torque signal indicative thereof;

means for determining a torque command value as a function of said low frequency assist torque signal and said high frequency assist torque signal and for providing a torque command signal indicative thereof; and means for commanding the electric assist motor to provide steering assist in accordance with said torque command signal.

11. The apparatus recited in claim 10, wherein said means for filtering includes means to filter the sensed torque signal with a low-pass filter for passing frequencies below a blending frequency, and means for filtering with a high-pass filter for passing frequencies above said blending frequency.

12. The apparatus recited in claim 11, wherein said blending frequency is selected as a function of said sensed vehicle speed.

13. The apparatus recited in claim 10, wherein said means for determining a high frequency assist gain value comprises means for determining said high frequency assist gain value as a function of said low frequency torque signal.

14. The apparatus recited in claim 10, wherein said means for determining a high frequency assist gain value comprises:

means for determining a low-speed high frequency assist gain as a function of said sensed torque signal;

means for determining a high-speed high frequency assist gain as a function of said sensed torque signal; and means for blending said low-speed high frequency assist gain and said high-speed high frequency assist gain as a function of vehicle speed, said high frequency assist gain value being responsive to the blended gains.

15. The apparatus recited in claim 14, wherein said means for blending said low-speed high frequency assist gain and said high-speed high frequency assist gain comprises:

means for determining a speed proportional factor as a function of the sensed vehicle speed, said speed proportional factor having a value ranging from zero to one based on the sensed vehicle speed;

means for determining a blended low-speed high frequency assist gain as the product of said low-speed high frequency assist gain and said speed proportional factor;

means for determining a blended high-speed high frequency assist gain as the product of said high-speed high frequency assist gain and the difference between one and said speed proportional factor; and means for determining the sum of said blended low-speed high frequency assist gain and said blended high-speed high frequency assist gain.

16. The apparatus recited in claim 10, wherein said means for determining a torque command value comprises:

means for determining a sum of said low frequency assist torque signal and said high frequency assist torque signal; and adaptive torque filtering means for filtering said sum of said low frequency assist torque signal and said high frequency assist torque signal.

* * * * *